May 20, 1941.　　H. N. WHITTELSEY　　2,242,635
MARINE VESSEL
Filed Dec. 22, 1937　　5 Sheets-Sheet 4
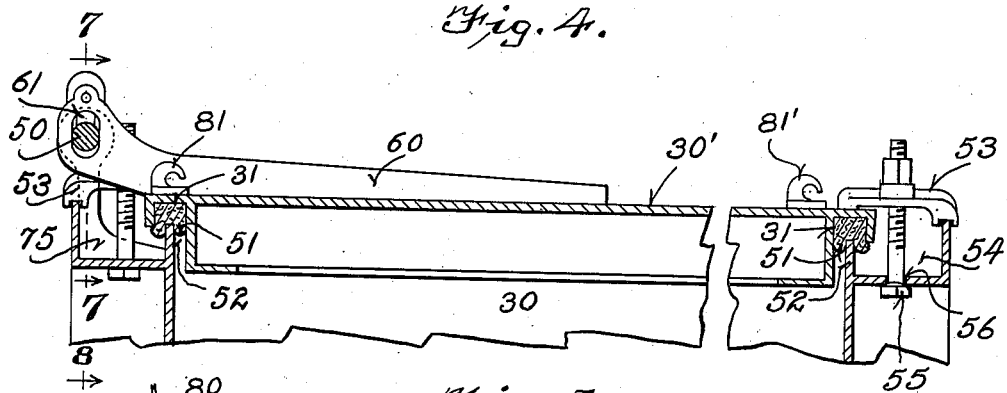
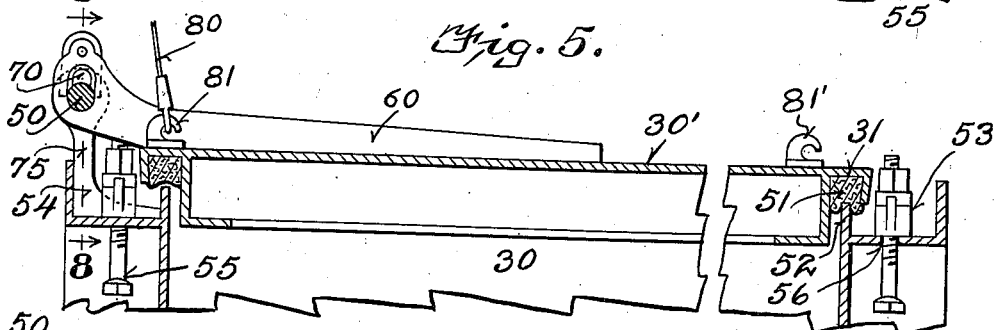
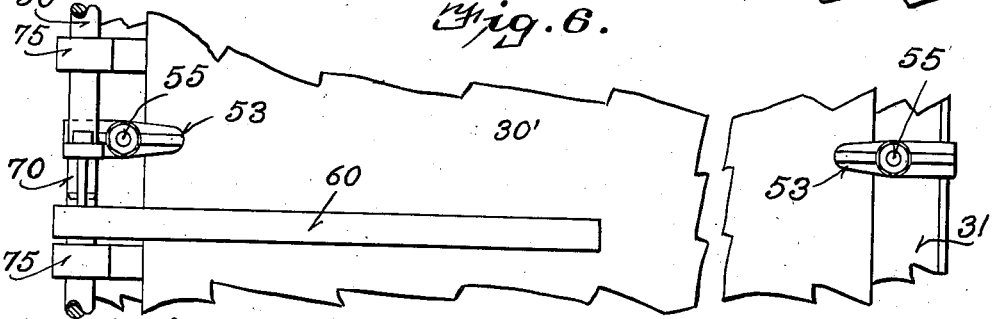
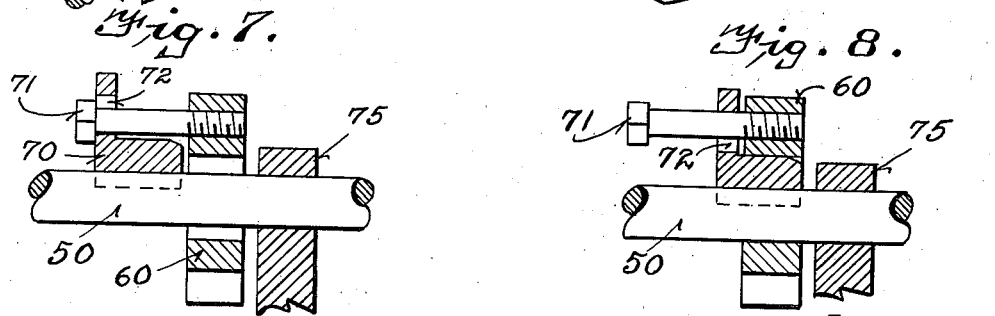
Inventor
H. Newton Whittelsey
By
J. Wesley Everett
Attorney May 20, 1941.  H. N. WHITTELSEY  2,242,635
MARINE VESSEL
Filed Dec. 22, 1937   5 Sheets-Sheet 5
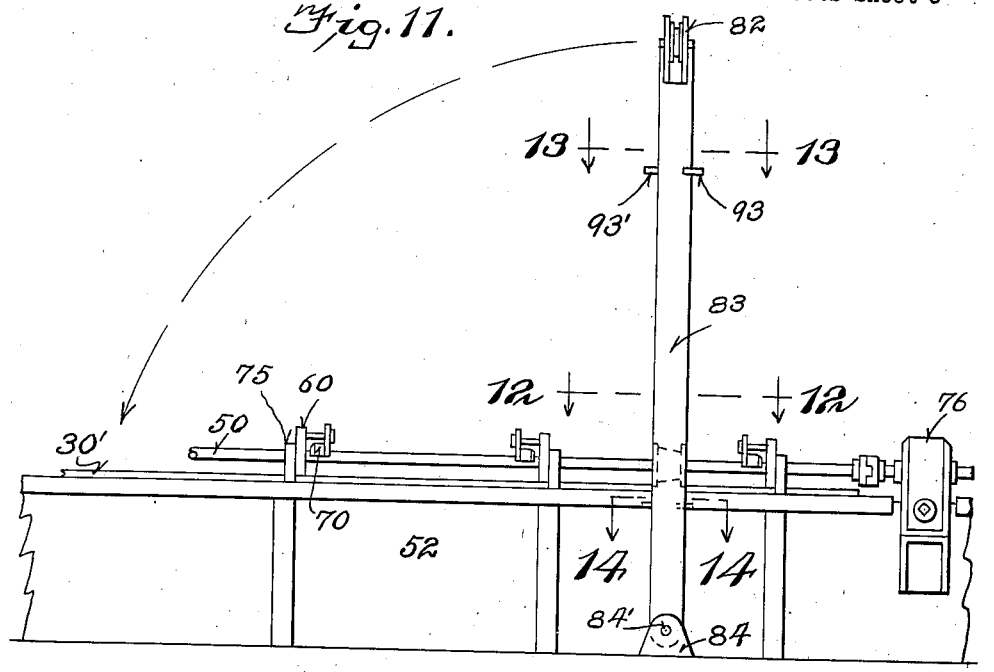
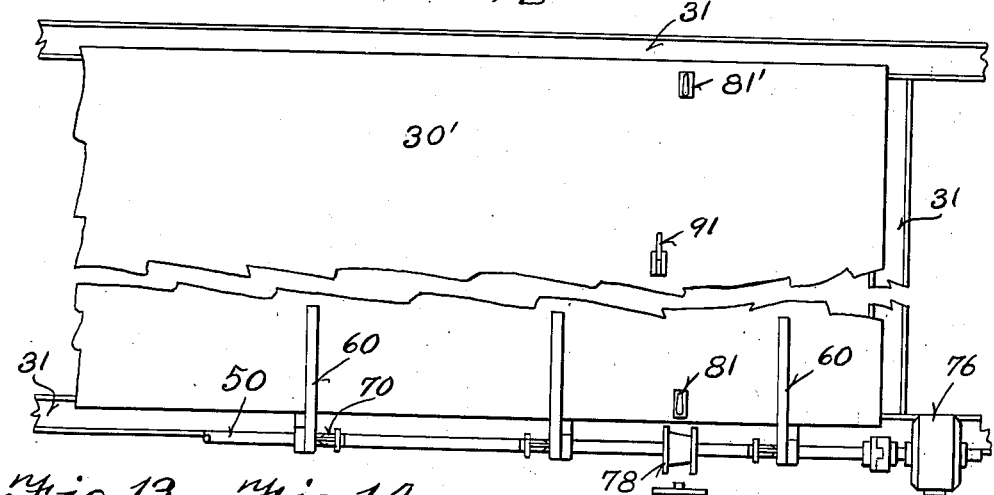
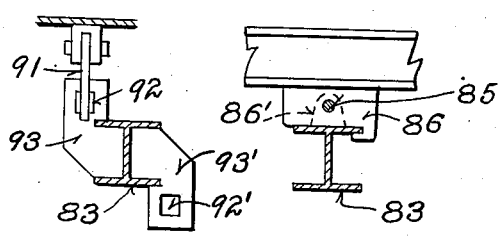
Inventor
H. Newton Whittelsey
By
J. Wesley Everett
Attorney Patented May 20, 1941

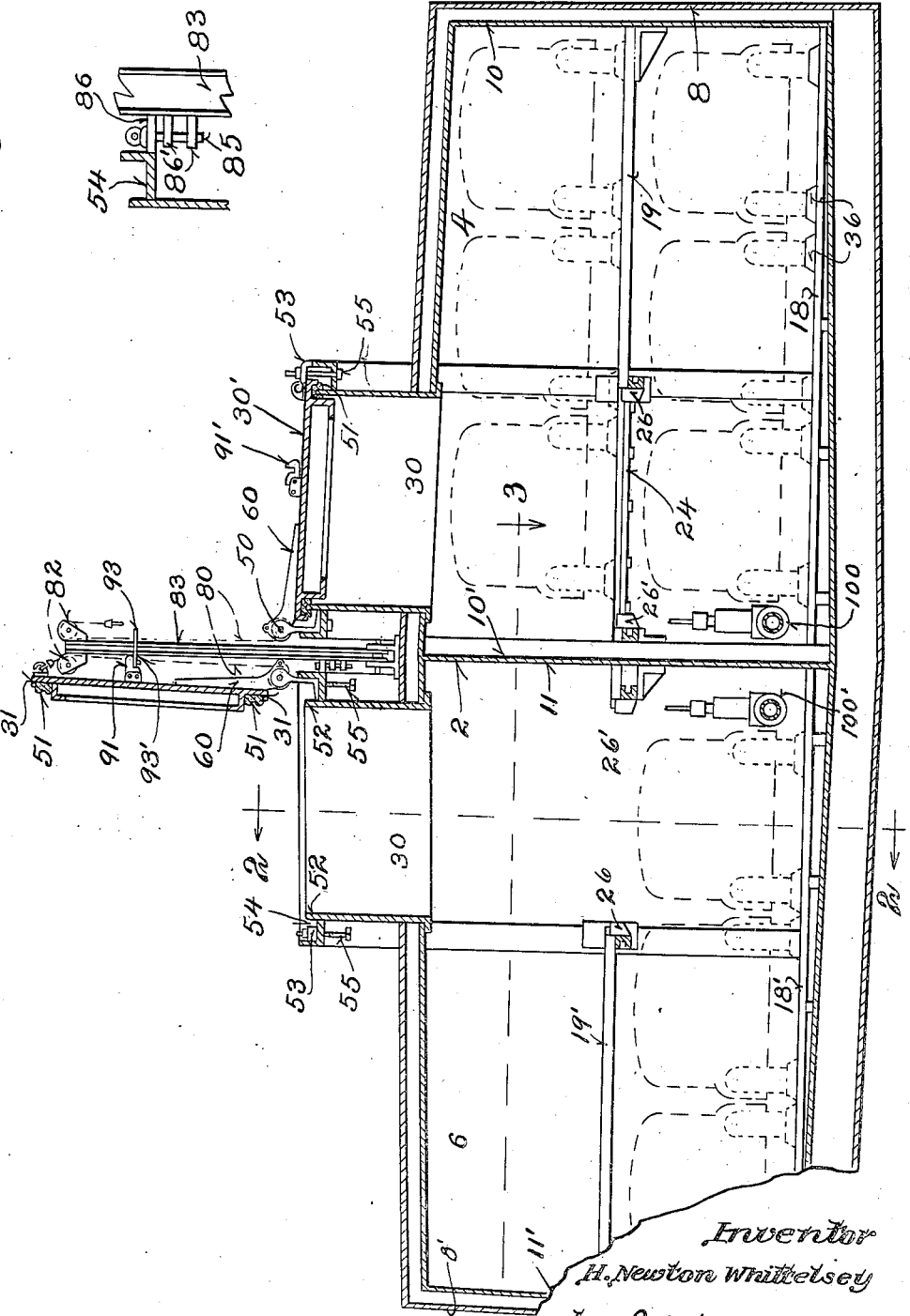

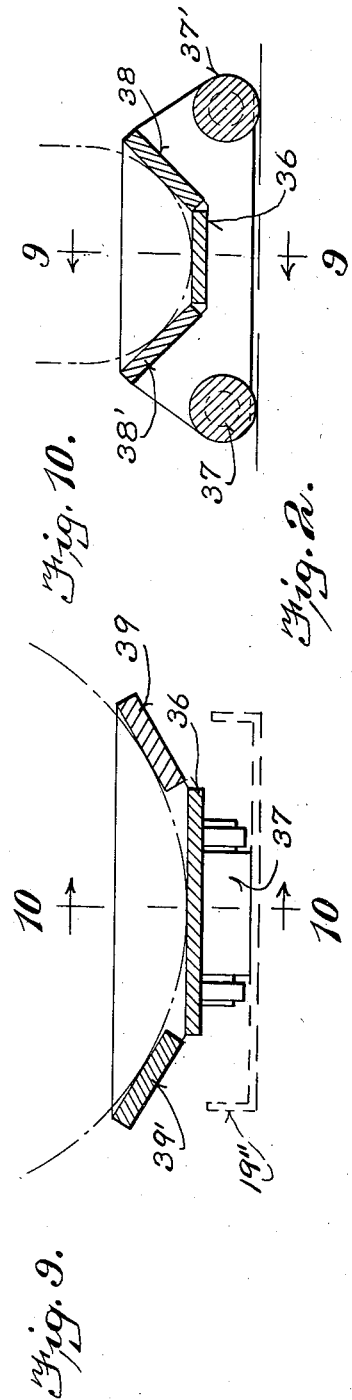
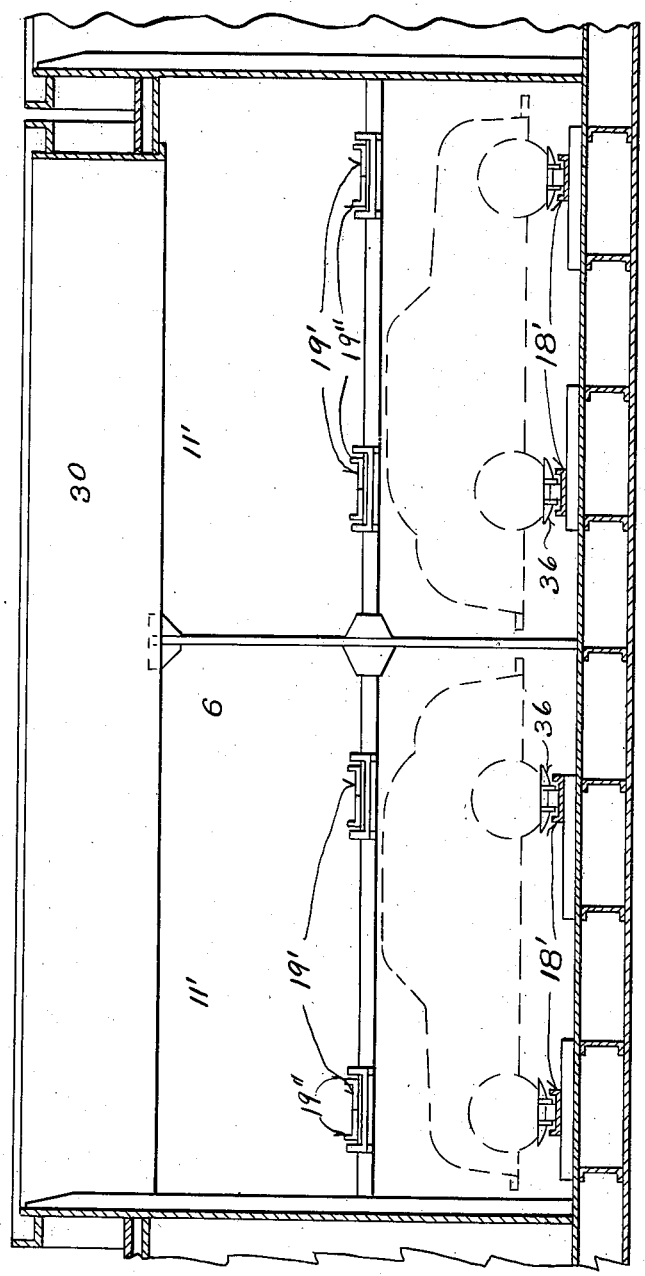

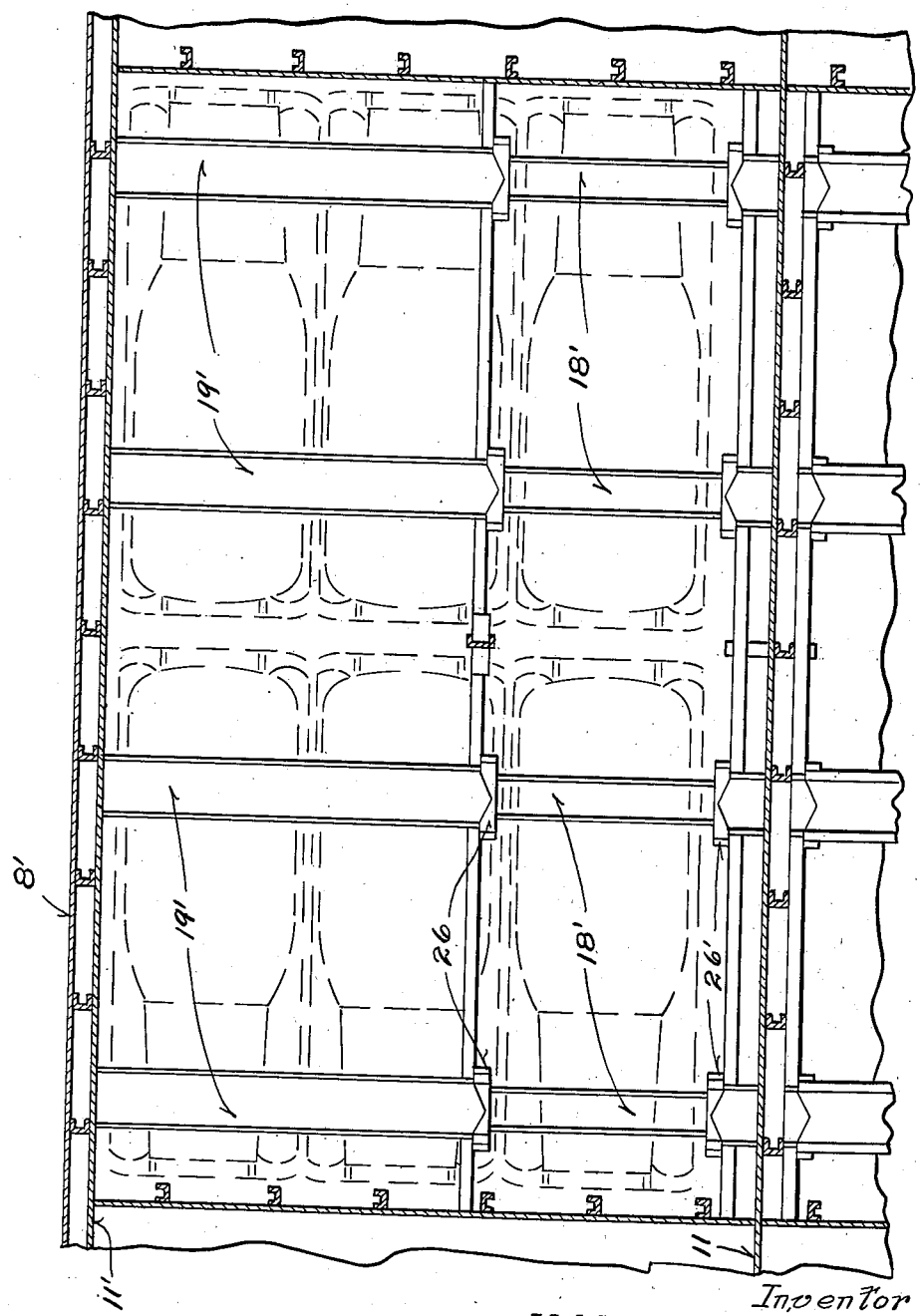

2,242,635

UNITED STATES PATENT OFFICE 2,242,635

MARINE VESSEL

Henry Newton Whittelsey, Greenwich, Conn.

Application December 22, 1937, Serial No. 181,216

2 Claims. (Cl. 114—72)

The present invention relates to marine vessels and particularly to those adapted to the transportation of oil or other liquid materials. These vessels are usually provided with a number of separate tanks positioned on either side of one or more bulkheads running longitudinally of the vessel.

This tank arrangement has proven quite satisfactory, however the disadvantage in vessels of this character is that they are not readily adaptable for the transportation of other types of freight and because of their unadaptability for other uses, tank vessels are seldom used for any other purpose other than for what they were constructed. Although in the past few years a few of these vessels have been transporting motor cars upon their upper decks. This practice exposes the vehicles to the elements and does not allow the use of the maximum cargo capacity of the ship.

It is therefore the primary object of this invention to construct the tanks of vessels of this type so that they may be readily adapted to the storage and transportation of wheeled vehicles and in particular motor cars.

A more specific object of the invention is to construct the tanks with properly located hatches so that a maximum number of motor vehicles may be stored within a tank of predetermined area.

Another more specific object of the invention is to provide novel ways and means of storing the vehicles within the tank.

Still another more specific object of the invention is to construct the tanks in such a manner that the change over from one type of cargo to the other can be easily and readily made.

Still further objects of the invention will appear from the following specification taken in connection with the drawings which form a part of this application and in which:

Fig. 1 is a cross sectional view of a vessel showing a tank positioned on either side of a centrally located bulkhead.

Fig. 2 is a longitudinal sectional view of one of the tanks taken along the line 2—2 of Fig. 1 showing the arrangement of the motor vehicles in tandem.

Fig. 3 is a horizontal sectional view taken along the line 3—3 of Fig. 1 showing the arrangement of the vehicles on the lower track.

Fig. 4 is an enlarged fragmentary sectional view of the hatch and hatch cover showing the hatch cover in closed position.

Fig. 5 is a view similar to Fig. 4 having the clamps removed and the cover in raised position adjacent the hinge.

Fig. 6 is a fragmentary top plan view of the hatch cover showing the hatch cover clamped in closed position as in Fig. 4.

Fig. 7 is a fragmentary sectional view taken substantially along the line 7—7 of Fig. 4.

Fig. 8 is a similar view taken along the line 8—8 of Fig. 5.

Fig. 9 is a sectional view of a portable truck for supporting the wheels of the vehicle.

Fig. 10 is a sectional view of the truck taken along the line 10—10 of Fig. 9.

Fig. 11 is a fragmentary view in elevation of the hatch coaming showing the hatch cover supporting mast and the hatch cover lifting cable operating means.

Fig. 12 is a fragmentary top plan view of the same taken along the line 12—12 of Fig. 11.

Fig. 13 is a sectional view of the mast taken along the line 13—13 of Fig. 11.

Fig. 14 is a sectional view of the mast taken along the line 14—14 of Fig. 11.

Fig. 15 is a fragmentary view in elevation of a portion of the mast showing the holding pin 85.

For convenience the present embodiment of the invention shows a vessel constructed with a single central longitudinal bulkhead 2. However it is particularly understood that vessels having a greater number of similar bulkheads may employ the same general principle described herein.

Arranged along either side of the bulkhead 2 are a plurality of tanks similar to those specifically described and designated by numerals 4 and 6. The width of the tanks extends from the bulk head 2 to the respective sides of the ship 8 and 8', the length of the tanks are such as to best accommodate the respective cargoes.

Within each tank there is provided adjacent and permanently supported from the bottom thereof a plurality of tracks 18 and 18' running perpendicular with the side walls 10, 10' and 11, 11' of the tanks for supporting the vehicles as shown in Figs. 1, 2, and 3. Extending above the lower tracks a sufficient distance to clear the cars stored thereon is a second group of tracks 19 and 19' similar to those positioned in the bottom of the tank for supporting a second tier of vehicles. The upper tracks are permanently secured within the tank, except for the portion 24 (see Fig. 1). This portion of the upper track is removable for the purpose of allowing the vehicles to pass by the upper track and be deposited on the lower tracks without interference from the upper track members. These members are preferably constructed of wood or other suitable non-sparking material and are held in place by suitable supports 26 and 26' positioned to hold the members 24 in line with the upper stationary tracks. The purpose of constructing these members of such material is to avoid any possible chance of sparking by hitting or striking the permanent members within the tank, which are usually constructed of steel, when removing or replacing the removable members. The length of these removable members compares substantially with the width of the hatch 30 and the width of the hatch 30 depends upon the type and class of vehicle the tank is constructed to accommodate.

The length and width of certain classes of standard vehicles are substantially the same varying only slightly in the length of their wheel bases. The object therefore being to construct the tanks to accommodate vehicles within certain classes. For example, the tanks may be constructed to accommodate cars having a wheel base ranging from 116 inches to 126 inches, but other tanks may be constructed to transport classes of cars of greater or lesser wheel bases.

When the vehicles are placed within the tank each individual wheel is supported upon a truck 36 adapted to roll upon the tracks 18, 18', 19, and 19' which are preferably made of channel iron having their sides 19'' extending upwardly as shown in Fig. 2. As has been stated hereinbefore, various chassis of vehicles may vary somewhat in their length. The width of the roller member 37 is substantially narrower than the track channel (see Fig. 9). This difference in width of the roller and track will compensate for the variation within certain limits for the different lengths of wheel bases of different cars. This allowance is always sufficient for the particular class of vehicles for which the tank is constructed to transport.

The truck 36 is provided with two rollers 37 and 37' rotatably mounted on suitable supports for supporting the truck. The truck has also side walls 38, 38', 39, and 39' for receiving and supporting the wheel of the vehicle. These trucks are sometimes known in the trade as "chocks" and are constructed of wood or some other non-sparking material as are the removable members 24 to prevent sparking from the handling of the chock within the tank or movement of the chock rollers over the tracks. The chocks and the removable member 24 are of comparatively light construction to enable them to be easily and conveniently stored in some other part of the ship when the tanks are being used for transporting oil or other liquid materials.

Each tank is provided with a hatch 30 extending substantially the full length of the tank, the width of which is slightly wider than the vehicles to be transported. The hatch is positioned longitudinally of the tank directly above the space allotted to any two cars arranged in tandem. That is, the hatch may be on either side of the tank or in the middle section. It is shown in the present form located on the side adjacent the center of the vessel, in either case the result will be the same in loading the cars. The object being to provide for vehicles to be lowered into the tank by a derrick or other suitable means and upon the trucks which are located on the track. The cars are then moved laterally over the track into an area allotted for each car which will clear the space below the hatch for the subsequent cars to be lowered on the same track.

In carrying out this system of loading vehicles in the tank the hatch is necessarily comparatively large. In order to handle and secure the hatch cover 30' easily and efficiently there are provided suitable derricks for this purpose, each hatch cover having separate equipment for this purpose. In detail the hatch cover 30' is provided with a channel 31 or other means for holding a packing material 51 about its periphery, which is adapted to rest upon the upper edge of a hatch coaming 52. The hatch cover is held closed by a sufficient number of clamps which are anchored into a channel 54 secured to the coaming by the bolts 55 which are slidably mounted within the holes 56. When the clamps are being used to exert pressure within the hatch they will be in the position as shown in Figs. 1, 4, and 6; and when released to allow the hatch cover to be raised they will be in the position as shown in Fig. 5. As stated hereinbefore the bolts 55 are slidably mounted within the holes 56 which will allow the clamp 53 to rest on the plate forming the bottom of the channel 54.

There is attached to each hatch cover a plurality of hinge members 60. These hinge members are adapted to pivot about a member 50 which is supported by the supporting member 75 and extending in a plane parallel with the edge of the hatch coaming. The hinge is provided with an elongated bearing 61, the axis of which, when the hinge is secured to the hatch cover and the hatch cover is in closed position, is perpendicular to the upper edge of the hatch coaming. The elongated bearing is such that when the supporting member 50 is adjacent the bottom of the bearing as shown in Fig. 5 the hatch cover will be brought out of contact with the hatch coaming adjacent the hinge, and when the support member 50 is allowed to move upwardly within the bearing 61, the packing material will be allowed to come in contact with the hatch coaming 52 and be in position to be clamped down by the clamp 53. The elongated bearing will always have a sufficient distance to allow for the free clamping of the hatch cover on the coaming. In order to support the hatch cover 30' in the position as shown in Fig. 5 there is provided a slidable block 70 adapted to fit against the upper portion of the elongated bearing 61 and occupy the remaining space within the bearing when the supporting member 50 has reached its lower limit as shown in Fig. 8. The block is attached to the hinge 60 by bolts 71 and is slidable longitudinally along the bolts and supporting member 50. The hole 72 in which the bolt 71 is slidable is also elongated for allowing the hinge 60 free movement within the limits of the bearing 61 when the block is in the position as shown in Fig. 7.

The member 50 has a dual purpose. First it is a support about which the hinges 60 of the hatch cover pivot. Secondly it operates as a windlass for opening and closing the hatch cover. The supports 75 are provided with suitable bearings into which the member 50 is rotatable by an electric motor or other convenient means, such as by hand crank, through a worm gear 76. About the shafts 50 are several properly located drums 78 and 79 to which suitable cables 80 are wound for operating the hatch covers. The cable extends upwardly over one of the pulleys 82 which is secured to the upper end of the hatch supporting mast 83 and down to one of the drums secured to the shaft 50. Two of these derricks are usually constructed for one cover, although a greater or lesser number may be used depending upon the size, weight, and etc. of the covers. The masts are designed to be lowered to the deck of the ship, for the purpose of increasing overhead clearance. The masts are pivotably secured to a suitable member 84 by the pin 84' and are held in an upright position by a pin 85 passing through a member 86 secured to the hatch coaming 52 or some other convenient place and the bracket 86' secured to the mast.

When it is desired to open a closed hatch, the clamps are loosened and turned parallel with the edge of the hatch cover, the clamps being unsupported will drop into the channel 54 as has been explained hereinbefore. When all the clamps have been released the cable 80 is attached to a suitable hook 81 (see Figs. 4 and 5), adjacent the side of the hatch cover nearest the hinge. The hatch cover is raised and the block 78 is moved within the hinge bearing as shown in Fig. 8. In this position the edge of the hinge cover adjacent the hinge is lifted free from its seat. The cable is then released and attached to a suitable hook member 81' secured to the opposite side of the hatch cover and rotated about the supporting member 50 until in a substantially vertical position where it is latched to the mast 83 by suitable hooks 91 and 91', which are secured to the hatch cover. The hooks are positioned on the cover to register with the holes 92 and 92' of the members 93 and 93' secured to the mast (see Figs. 1 and 13). In lowering the hatch cover the operations are reversed. With this arrangement the hatch cover can be opened, or closed without injury to the packing or damaging the hatch coaming.

When the vessel is to be used for transporting oil, the removable supporting member 24 and the trucks 36 are removed and stored outside the tanks in a suitable place provided for them. The hatches are closed as described above and secured tight by the clamps 53. By means of suitable pipes and valves as shown at 100 and 100' the tanks may be filled and exhausted by suitable equipment carried for that purpose.

When the vessel is to be used for the transportation of vehicles, the hatches are raised as described and the vehicles are first lowered to the lower tracks 18 and 18' and moved laterally along the tracks upon the roller trucks 36 until the vehicles have reached their proper position in the tanks, the last vehicle being positioned directly under the hatch, where they may be lashed in place. When the lower tracks have been filled the removable members 24 are placed in position within the brackets 26 and 26' to form a continuation of the upper tracks and the vehicles are lowered into the tank on the upper tracks and moved laterally as has just been described for the lower tracks.

The vehicles are generally lowered vertically into the tank by a derrick either operating from the shore or on some other vessel depending upon the loading equipment available.

There is a decided advantage to be gained in the use of vessels of this type. By this arrangement of storing vehicles within the tanks of oil vessels and where such vessels ply between several ports, some exporting oil and importing vehicles, the tanks of the vessels may be employed to transport oil in one direction and motor vehicles in the other direction without the loss of storage space and at the same time insure protection to the vehicles by being stored within the hold of the ship.

While one form of the present invention has been shown and described in detail, it is to be understood that it is not to be limited to this specific disclosure and that its scope is best defined in the following claims.

I claim:

1. A vessel of the character described having a central bulkhead and a plurality of transverse bulkheads forming tanks adapted for the storage of oil along each side of the vessel, each of said tanks extending from the center bulkhead of the vessel outwardly to the sides thereof, a hatch in the top of each tank of substantially lesser width than that of the tank and located along the side of the tank adjacent the center bulkhead, cover means for sealing the hatch, upper and lower tracks running laterally of the vessel within said tanks for supporting motor vehicles thereon, the portion of the said upper track below the said hatch being removable whereby the vehicles may be positioned on the lower tracks through the said hatch.

2. A vessel of the character described having a central bulkhead and a plurality of transverse bulkheads forming tanks adapted for the storage of oil along each side of the vessel, each of said tanks extending from the center bulkhead of the vessel outwardly to the sides thereof, a hatch in the top of each tank of substantially lesser width than that of the tank, cover means for sealing the hatch, upper and lower tracks running laterally of the vessel within said tanks for supporting motor vehicles thereon, the portion of the said upper track below the said hatch being removable whereby the vehicles may be positioned on the lower tracks through the said hatch.

H. NEWTON WHITTELSEY.